US012573708B2

(12) United States Patent
Sato et al.

(10) Patent No.: US 12,573,708 B2
(45) Date of Patent: Mar. 10, 2026

(54) BATTERY WIRING MODULE

(71) Applicant: SUMITOMO WIRING SYSTEMS, LTD., Mie (JP)

(72) Inventors: Hiroshi Sato, Mie (JP); Ryota Mori, Mie (JP); Hisayoshi Yaita, Mie (JP); Masami Suzuki, Mie (JP); Maya Nakasuka, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 612 days.

(21) Appl. No.: 17/924,077

(22) PCT Filed: May 18, 2021

(86) PCT No.: PCT/JP2021/018755
§ 371 (c)(1),
(2) Date: Nov. 8, 2022

(87) PCT Pub. No.: WO2021/241322
PCT Pub. Date: Dec. 2, 2021

(65) Prior Publication Data
US 2023/0223640 A1     Jul. 13, 2023

(30) Foreign Application Priority Data

May 25, 2020     (JP) ................................. 2020-090489

(51) Int. Cl.
*H01M 50/298*     (2021.01)
*H01M 50/503*     (2021.01)
*H01M 50/507*     (2021.01)

(52) U.S. Cl.
CPC ....... *H01M 50/298* (2021.01); *H01M 50/503* (2021.01); *H01M 50/507* (2021.01)

(58) Field of Classification Search
None
See application file for complete search history.

(56) References Cited

U.S. PATENT DOCUMENTS

| 2011/0064987 A1* | 3/2011 | Ogasawara | ......... H01M 50/507 |
| | | | 174/68.2 |
| 2014/0154551 A1 | 6/2014 | Nakayama | |

(Continued)

FOREIGN PATENT DOCUMENTS

| JP | 2013-161566 A | 8/2013 | |
| WO | WO-2013069527 A1 * | 5/2013 | ............ H01M 2/206 |

OTHER PUBLICATIONS

Machine Translation of WO-2013069527-A1 (Year: 2013).*
International Search Report issued on Aug. 24, 2021 for WO 2021/241322 A1 (4 pages).

*Primary Examiner* — Gregg Cantelmo
(74) *Attorney, Agent, or Firm* — Venjuris, P.C.

(57)     ABSTRACT

A case of a battery wiring module includes a first case body that has a groove-like first wire insertion portion, a second case body that has a groove-like second wire insertion portion, a first cover that covers an opening of the first wire insertion portion, and a second cover that covers an opening of the second wire insertion portion. The first wire insertion portion and the second wire insertion portion are provided in parallel along the lengthwise direction of an electric wire. In addition, the opening of the first wire insertion portion and the opening of the second wire insertion portion are open in the same direction. The case also includes an overlapping portion in which the first cover and the second cover overlap each other in the opening direction of opening of first and second wire insertion portions.

6 Claims, 4 Drawing Sheets

(56)                    References Cited

U.S. PATENT DOCUMENTS

| | | |
|---|---|---|
| 2018/0175522 A1 | 6/2018 | Ogasawara et al. |
| 2018/0294464 A1 | 10/2018 | Mori et al. |

\* cited by examiner

BATTERY WIRING MODULE

CROSS REFERENCE TO RELATED APPLICATIONS

This application is a national phase of PCT application No. PCT/JP2021/018755, filed on 18 May 2021, which claims priority from Japanese patent application No. 2020-090489, filed on 25 May 2020, all of which are incorporated herein by reference.

TECHNICAL FIELD

The present disclosure relates to a battery wiring module.

BACKGROUND

As disclosed in Patent Document 1, for example, in a vehicle such as an electric automobile or a hybrid automobile, a battery wiring module is mounted to a high-voltage secondary battery that is mounted as a travelling drive power source. The battery wiring module in Patent Document 1 includes an electric wire that is electrically connected to the secondary battery, and a case that houses the electric wire. The case of the battery wiring module includes a plurality of case bodies that are aligned along the lengthwise direction of the electric wire, and a plurality of covers respectively corresponding to the plurality of case bodies. The case bodies have groove-like wire insertion portions through which the electric wire is passed, and the covers cover the wire insertion portions of the corresponding case body. The covers protect the electric wire that passes through the wire insertion portions of the case bodies. With such a configuration, for example, when the secondary battery thermally expands along the lengthwise direction of the electric wire, the case bodies and the covers move along the lengthwise direction of the electric wire, accompanying the heat expansion of the secondary battery, increasing the connection reliability between the secondary battery and the battery wiring module.

PRIOR ART DOCUMENT

Patent Document

Patent Document 1: JP 2013-161566 A

SUMMARY OF THE INVENTION

Problems to be Solved

In a battery wiring module such as that described above, when the distance between adjacent case bodies in the lengthwise direction of an electric wire increases due to heat expansion of a secondary battery or the like, the distance between covers that move along with the case bodies also increases, and there has been a risk that the electric wire will be exposed from the gap between the covers.

In view of this, an object of the present disclosure is to provide a battery wiring module that can keep an electric wire from being exposed from between covers that cover wire insertion portions of case bodies.

Means to Solve the Problem

A battery wiring module according to the present disclosure is a battery wiring module to be attached to a secondary battery, including: an electric wire to be electrically connected to the secondary battery, and a case that houses the electric wire, the case including: a first case body that has a groove-like first wire insertion portion through which the electric wire is passed, a second case body that has a groove-like second wire insertion portion through which the electric wire is passed, a first cover that covers an opening of the first wire insertion portion, and a second cover that covers an opening of the second wire insertion portion, the first wire insertion portion and the second wire insertion portion being provided in parallel along a lengthwise direction of the electric wire, the opening of the first wire insertion portion and the opening of the second wire insertion portion being open in the same direction, and the case including an overlapping portion in which the first cover and the second cover overlap each other in the opening direction of the two openings.

Effect of the Invention

According to the present disclosure, it is possible to provide a battery wiring module that can keep an electric wire from being exposed from between covers that cover wire insertion portions of case bodies.

DETAILED DESCRIPTION TO EXECUTE THE INVENTION

Description of Embodiments of Present Disclosure

Figure 1:
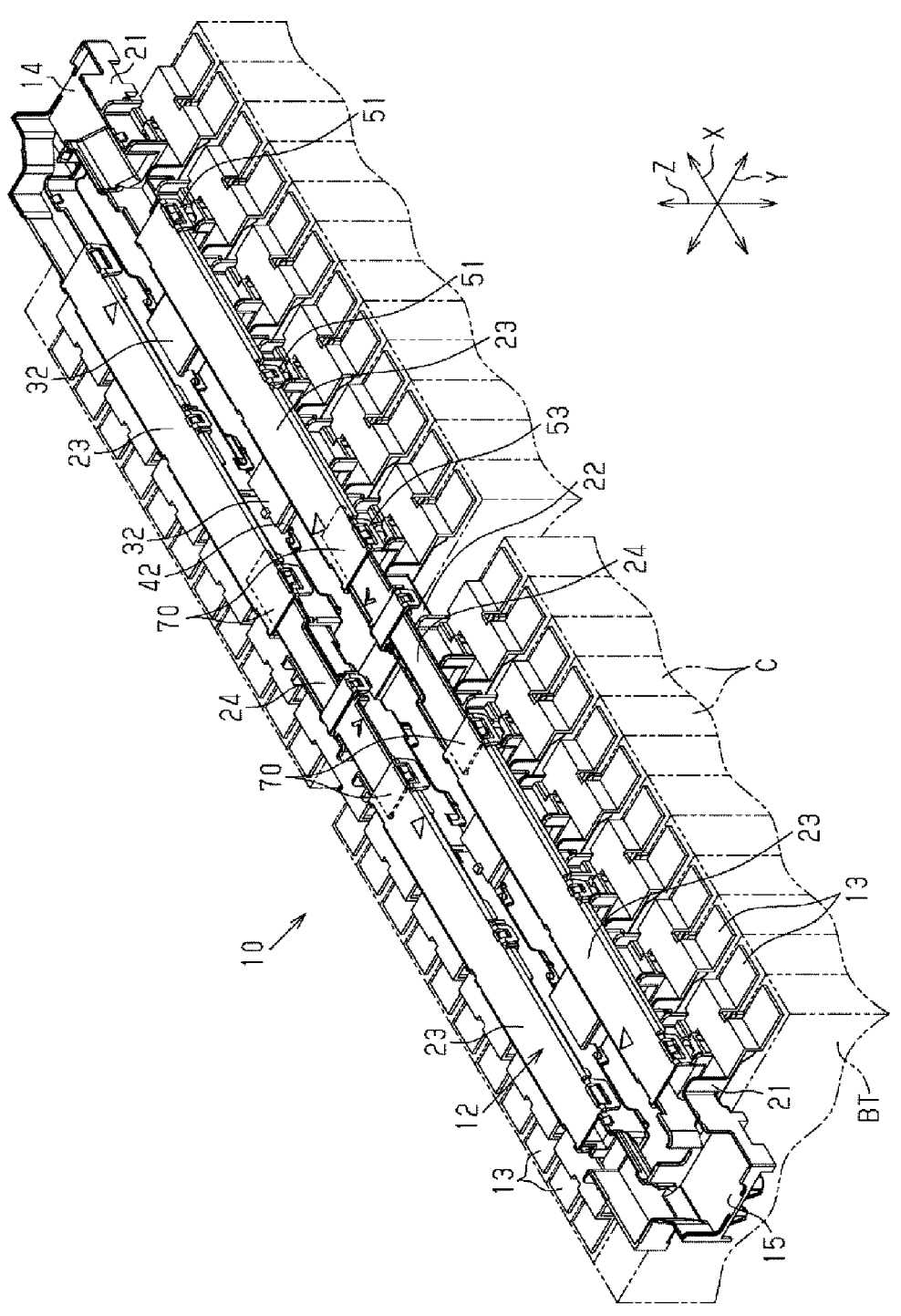
FIG. 1 is a perspective view of a battery wiring module according to an embodiment of the present disclosure.

Firstly, embodiments of the present disclosure will be listed and described.

[1] A battery wiring module according to the present disclosure is a battery wiring module to be attached to a secondary battery, including: an electric wire to be electrically connected to the secondary battery, and a case that houses the electric wire, the case including: a first case body that has a groove-like first wire insertion portion through which the electric wire is passed, a second case body that has a groove-like second wire insertion portion through which the electric wire is passed, a first cover that covers an opening of the first wire insertion portion, and a second cover that covers an opening of the second wire insertion portion, the first wire insertion portion and the second wire insertion portion being provided in parallel along a lengthwise direction of the electric wire, the opening of the first wire insertion portion and the opening of the second wire insertion portion being open in the same direction, and the case including an overlapping portion in which the first cover and the second cover overlap each other in the opening direction of the two openings.

With this configuration, even if the distance between the first case body and the second case body along the lengthwise direction of the electric wire is increased due to heat expansion of the secondary battery or the like, it is possible to prevent a gap from being formed between the first cover and the second cover, using the overlapping portion. Thus, it is possible to prevent the electric wire from being exposed from between the first cover and the second cover. In addition, as a result of preventing a gap from being formed between the first cover and the second cover using the overlapping portion, it is possible to prevent the electric wire from popping out from the gap between the first cover and the second cover.

[2] The first cover includes an extension portion that extends to a position where the opening of the second wire insertion portion is covered, and constitutes the overlapping portion.

With this configuration, it is possible to form the overlapping portion in which the first cover and the second cover overlap each other, using the extension portion of the first cover.

[3] The extension portion includes an engaging portion engaged with the second case body in a direction that lies along the opening direction of the two openings.

With this configuration, it is possible to keep the extension portion of the first cover from rising, in other words, from separating from the second wire insertion portion in the opening direction, as a result of the engaging portion being engaged with the second case body.

[4] The engaging portion is provided in a leading end portion of the extension portion.

With this configuration, it is possible to further keep the extension portion of the first cover from rising, in other words, from separating from the second wire insertion portion in the opening direction, as a result of the engaging portion being engaged with the second case body.

[5] The engaging portion is configured to be movable relative to the second case body, in a direction that lies along the lengthwise direction of the electric wire.

With this configuration, it is possible to relatively move the second case body in accordance with heat expansion of the secondary battery while adopting a configuration in which the extension portion of the first cover is engaged with the second case body.

[6] A region of the second cover in the overlapping portion is positioned on the inner side of the second wire insertion portion.

With this configuration, the region of the second cover in the overlapping portion of the first cover and the second cover is positioned on the inner side of the second wire insertion portion, and thus it is possible to form the overlapping portion of the first cover and the second cover, without increasing the size of the case in the opening direction of the second wire insertion portion.

DETAILED DESCRIPTION OF EMBODIMENTS OF PRESENT DISCLOSURE

Specific examples of a battery wiring module according to the present disclosure will be described below with reference to the drawings. In the drawings, some of the components may be shown exaggerated or simplified for the sake of convenience of description. In addition, the dimensional ratios of the components may be different in each of the drawings. Being "orthogonal" as used herein includes not only being strictly orthogonal, but also being generally orthogonal, as long as the actions and effects of the present embodiment can be achieved. Note that the present invention is not limited to these examples, and is defined by the claims, and all changes that come within the meaning and range of equivalency of the claims are intended to be embraced therein.

As shown in FIG. 1, a battery wiring module 10 according to an embodiment of the present disclosure is attached to a secondary battery BT that is mounted in an electric automobile, a hybrid automobile, or the like. The secondary battery BT supplies power to a travelling motor (not illustrated) of the vehicle. Also, the secondary battery BT is supplied with power from the travelling motor or a power generation motor in accordance with a charge state and a driving state of the vehicle.

The secondary battery BT includes a plurality of battery cells C. The secondary battery BT has a substantially rectangular parallelepiped shape as a result of the plurality of battery cells C being aligned in one direction, for example. The battery wiring module 10 is mounted on one side surface of the secondary battery BT. Note that the following description will be given assuming that the surface of the secondary battery BT on which the battery wiring module 10 is mounted is the upper surface of the secondary battery BT, and the battery wiring module 10 side of the secondary battery BT is upward. In addition, an X axis from among XYZ axes in the drawings that are orthogonal to one another represents the longitudinal direction X of a case 12 of the battery wiring module 10, the Y axis represents the width direction Y of the case 12, and the Z axis represents the height direction Z of the case 12. The battery cells C are provided in parallel along the longitudinal direction X of the battery wiring module 10.

Figure 2:
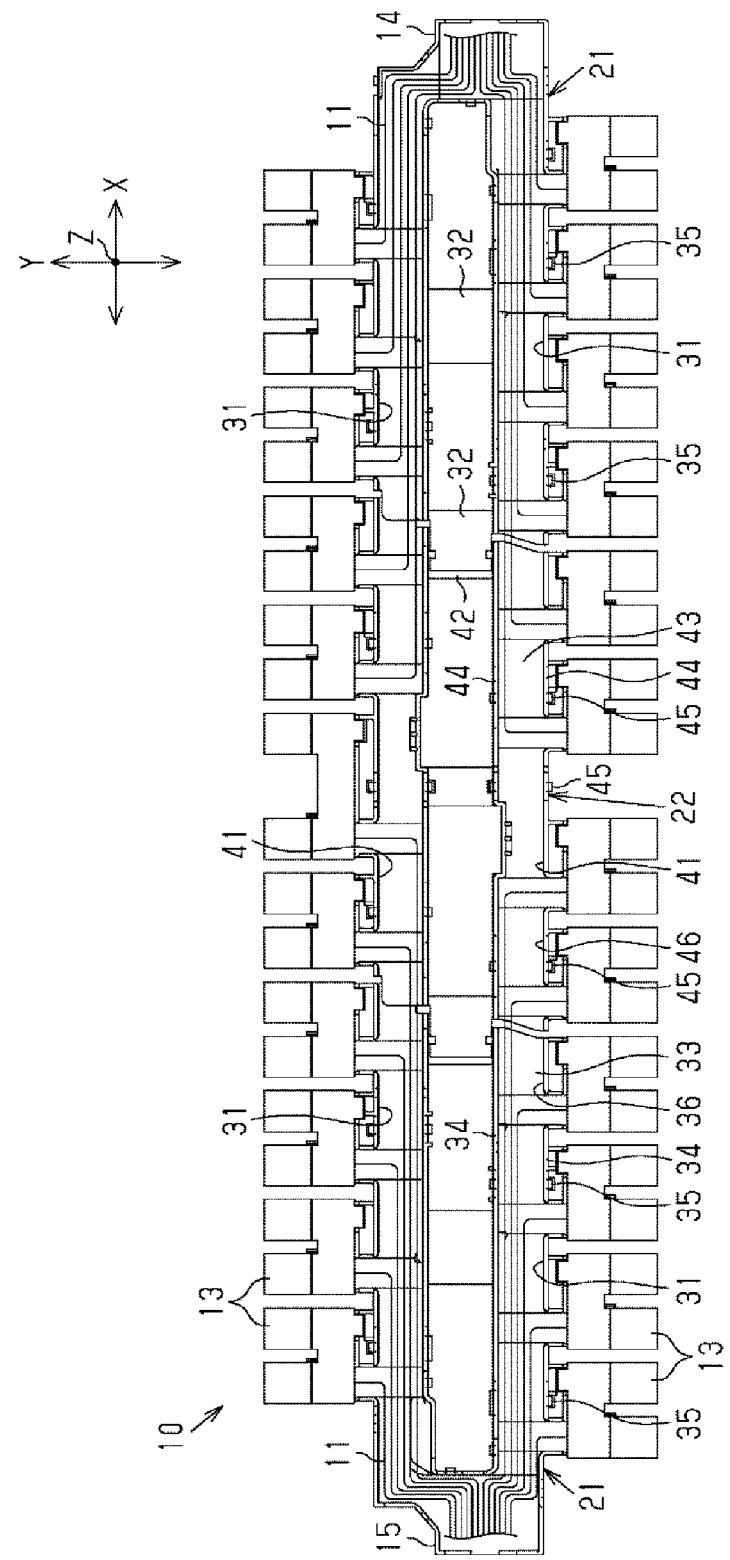
FIG. 2 is a plan view showing the battery wiring module according to the embodiment in a state where a first cover and a second cover are removed.

As shown in FIGS. 1 and 2, the battery wiring module 10 includes a plurality of electric wires 11 that are electrically connected to the secondary battery BT, and the case 12 that houses the electric wires 11. Note that the electric wires 11 are not illustrated in FIG. 1.

Also, the battery wiring module 10 according to the present embodiment includes a plurality of busbars 13 supported by the case 12, for example. The plurality of busbars 13 are aligned on each of the two sides in the width direction Y of the case 12, along the longitudinal direction X of the case 12, for example. A positive electrode terminal and a negative electrode terminal (not illustrated) provided on the upper surface of each battery cell C are connected to the busbar 13.

As shown in FIG. 2, the busbars 13 are electrically connected to the corresponding electric wires 11, respectively. The electric wires 11 are inserted into the case 12 along the longitudinal direction X. Some of the plurality of electric wires 11 are led to the outside of the case 12 from a first wire lead-out portion 14 provided in one end portion in the longitudinal direction X of the case 12, and the plurality of remaining electric wires 11 are lead to the outside of the case 12 from a second wire lead-out portion 15 provided in the other end portion in the longitudinal direction X of the case 12.

Case 12

As shown in FIG. 1, the case 12 includes a first case body 21 and a second case body 22 that are aligned in the longitudinal direction X of the case 12, and a first cover 23 and a second cover 24 respectively corresponding to the first case body 21 and the second case body 22. The first case body 21 and the second case body 22 are formed separately from each other. The first cover 23 and the second cover 24 are also formed separately from each other. Note that the first case body 21, the second case body 22, the first cover 23, and the second cover 24 are each formed of a synthetic resin, for example.

The case 12 according to the present embodiment includes a pair of first case bodies 21. The second case body 22 is provided between the pair of first case bodies 21. The pair of first case bodies 21 and the second case body 22 are provided in parallel in the longitudinal direction X of the case 12. Note that one of the first case bodies 21 includes the first wire lead-out portion 14, the other first case body 21 includes the second wire lead-out portion 15.

First Case Bodies 21

As shown in FIG. 2, the first case bodies 21 include groove-like first wire insertion portions 31 through which electric wires 11 are inserted. Note that FIG. 2 is a plan view of the battery wiring module 10 in a state where the first covers 23 and the second covers 24 are removed.

The first wire insertion portions 31 extend along the longitudinal direction X of the case 12. Also, each of the first case bodies 21 according to the present embodiment includes two first wire insertion portions 31 that are aligned in the width direction Y of the case 12, for example. The two first wire insertion portions 31 are coupled to each other by first coupling portions 32.

Each first wire insertion portion 31 includes a first bottom wall portion 33, a pair of first side wall portions 34 extending upward from the first bottom wall portion 33, and a plurality of first engagement portions 35 provided on each of the first side wall portions 34. The pair of first side wall portions 34 oppose each other in the width direction Y. The first wire insertion portion 31 has a groove-like shape due to the first bottom wall portion 33 and the first side wall portions 34. Each electric wire 11 is inserted between adjacent first side wall portions 34. The plurality of first engagement portions 35 protrude from the outer side surface of each first side wall portion 34.

On the side on which the first side wall portions 34 are open, in other words, on the upper end portion side of the first side wall portions 34, the first wire insertion portion 31 has an opening 36 that is open in a direction orthogonal to the insertion direction of the electric wires 11. That is to say, the opening 36 of the first wire insertion portion 31 according to the present embodiment is open upward.

Second Case Body 22

The second case body 22 includes groove-like second wire insertion portions 41 through which electric wires 11 are passed. The second wire insertion portions 41 extend along the longitudinal direction X of the case 12. In addition, for example, each second case body 22 according to the present embodiment includes two second wire insertion portions 41 that are aligned in the width direction Y of the case 12. The two second wire insertion portions 41 are coupled to each other by a second coupling portion 42.

Each of the second wire insertion portions 41 includes a second bottom wall portion 43, a pair of second side wall portions 44 extending upward from the second bottom wall portion 43, and second engagement portions 45 respectively provided on the second side wall portions 44. The pair of second side wall portions 44 oppose each other in the width direction Y. The second wire insertion portion 41 has a groove-like shape due to the second bottom wall portion 43 and the second side wall portions 44. Electric wires 11 are inserted between the second side wall portions 44. The plurality of second engagement portions 45 protrude from outer side surfaces of the second side wall portions 44.

On the side on which the second side wall portions 44 are open, in other words, on the upper end portion side of the second side wall portions 44, the second wire insertion portion 41 has an opening 46 that is open in a direction orthogonal to the insertion direction of the electric wires 11. In other words, the opening 46 of the second wire insertion portion 41 according to the present embodiment is open upward.

The first wire insertion portions 31 of the first case bodies 21, and the second wire insertion portions 41 of the second case body 22 are provided in parallel along the longitudinal direction X of the case 12. In addition, the openings 36 of the first wire insertion portions 31 and the openings 46 of the second wire insertion portions 41 are open in the same direction.

First Covers 23

Figure 3:
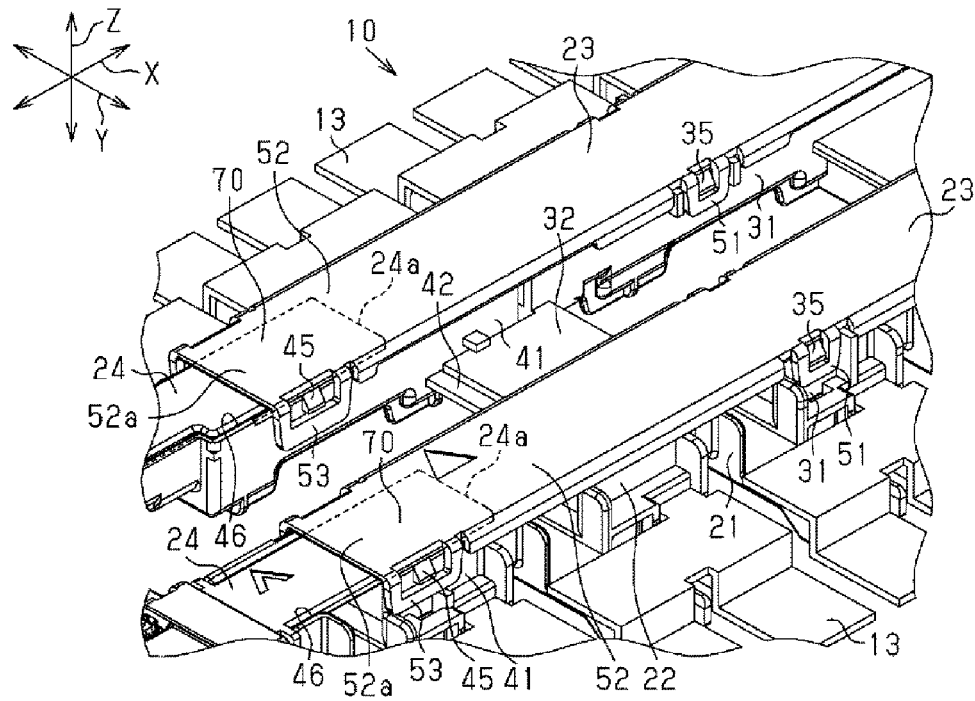
FIG. 3 is an enlarged perspective view of a portion of the battery wiring module according to the embodiment.

As shown in FIGS. 1 and 3, the number of first covers 23 according to the present embodiment is four in correspondence with the two first wire insertion portions 31 in each of the two first case bodies 21. The first covers 23 are attached to the first case bodies 21 in a mode of covering the openings 36 of the first wire insertion portions 31. Each of the first covers 23 includes first engaging portions 51 that are engaged with the first engagement portions 35 of the first wire insertion portion 31. A plurality of first engaging portions 51 are provided in correspondence with the plurality of first engagement portions 35 of the first wire insertion portion 31. The first engaging portions 51 are engaged with the first engagement portions 35 in a direction that lies along the opening direction of the opening 36 of the first wire insertion portion 31, in other words, the height direction Z. Accordingly, the first cover 23 is attached to the first wire insertion portion 31. Note that the first engaging portions 51 are provided on the two sides in the width direction Y of the first cover 23.

The first cover 23 includes an extension portion 52 extending along the longitudinal direction X to a position where the opening 46 of the second wire insertion portion 41 is covered. The extension portion 52 is positioned above the second wire insertion portion 41, in other words, on the outer side of the second wire insertion portion 41, and covers the upper side of the opening 46 of the second wire insertion portion 41.

The extension portion 52 includes second engaging portions 53 that are engaged with the second case body 22 side. The second engaging portions 53 are provided in a leading end portion 52a in the longitudinal direction X of the extension portion 52. The second engaging portions 53 are engaged with some of the plurality of the second engagement portions 45. The second engaging portions 53 are engaged with the second engagement portions 45 in a direction that lies along the opening direction of the opening 46 of the second wire insertion portion 41, in other words, the height direction Z. Note that the second engaging portions 53 are provided on the two sides in the width direction Y of the extension portion 52.

The second engaging portions 53 are configured to be movable relative to the second engagement portions 45 of the second wire insertion portion 41, in a direction that lies along the lengthwise direction of the electric wires 11, in other words, the longitudinal direction X of the case 12. Specifically, a gap is set between each second engaging portion 53 and the second engagement portion 45 in the longitudinal direction X of the case 12.

Second Covers 24

Figure 4:
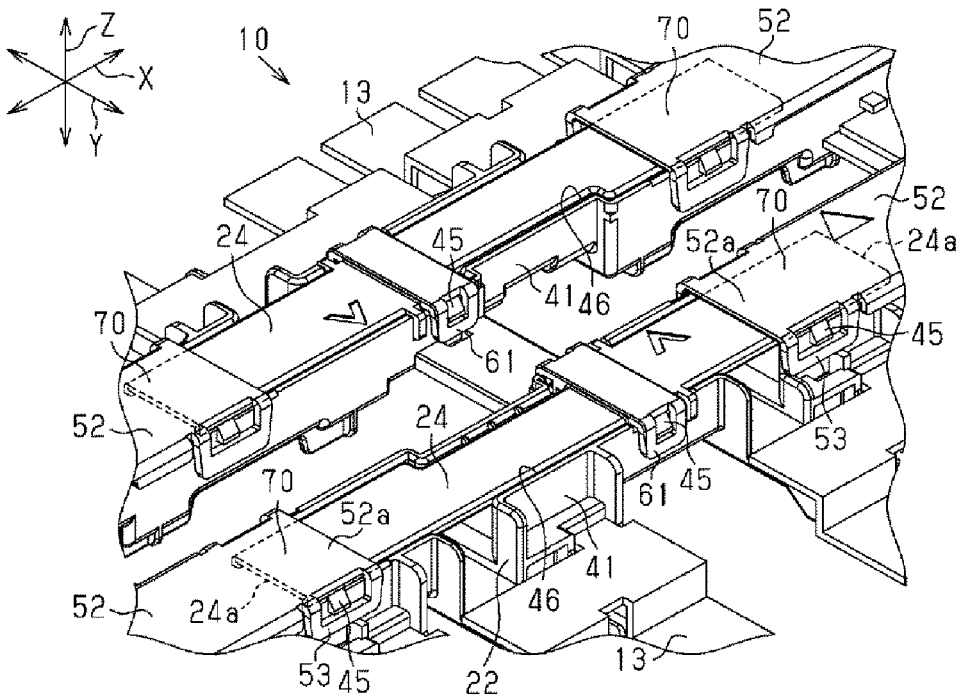
FIG. 4 is an enlarged perspective view of a portion of the battery wiring module according to the embodiment.

As shown in FIGS. 3 and 4, the number of second covers 24 according to the present embodiment that are provided is two in correspondence with the two second wire insertion portions 41 in the second case body 22. The second covers 24 are attached to the second case body 22 in a mode of covering the openings 46 of the second wire insertion portions 41. Each of the second covers 24 includes third engaging portions 61 that are engaged with the second engagement portions 45 of the second wire insertion portion 41. the third engaging portions 61 are engaged with the second engagement portions 45, in a direction that lies along the opening direction of the opening 46 of the second wire insertion portion 41, in other words, the height direction Z. Accordingly, the second cover 24 is attached to the second wire insertion portion 41. Note that the third engaging portions 61 are provided on the two sides in the width direction Y of the second cover 24.

End portions 24a on the two sides in the longitudinal direction X of each second cover 24 are positioned below the extension portions 52 of the first covers 23. In addition, the two end portions 24a of the second cover 24 are positioned between the pair of second side wall portions 44. That is to say, the two end portions 24a of the second cover 24 are positioned on the inner side of the second wire insertion portion 41.

The two end portions 24a of the second cover 24 overlap the extension portions 52 of the first covers 23, in a direction that lies along the opening direction of the opening 46 of the second wire insertion portion 41, in other words, the height direction Z. In this manner, in the case 12 according to the present embodiment, the overlapping portions 70 in each of which the second cover 24 and the extension portion 52 of the first cover 23 overlap each other in the height direction Z are formed.

In each overlapping portion 70, the second cover 24 and the extension portion 52 of the first cover 23 abut against each other in the height direction Z, or oppose to each other via a gap. If, in the overlapping portion 70, the second cover 24 and the extension portion 52 of the first cover 23 abut against each other, it is possible to secure a large wire housing space of the second wire insertion portion 41. On the other hand, if, in the overlapping portion 70, the second cover 24 and the extension portion 52 of the first cover 23 are spaced apart from each other, it is possible to suppress abrasion caused by the second cover 24 and the extension portion 52 of the first cover 23 rubbing against each other.

Actions of the present embodiment will be described.

Figure 5:
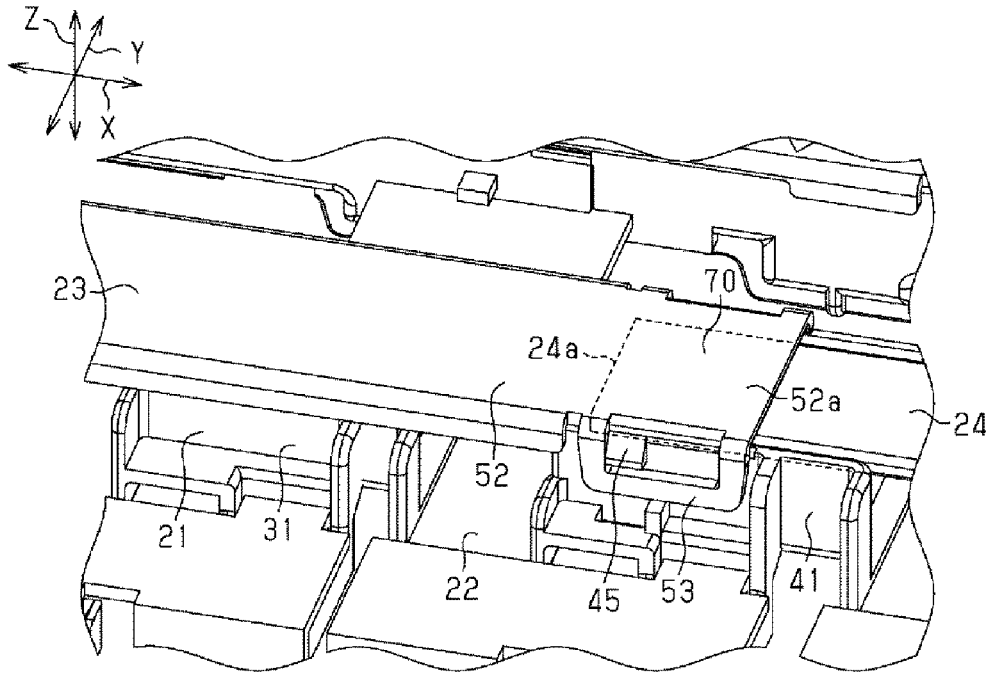
FIG. 5 is a perspective view for describing actions of the battery wiring module according to the embodiment.
Figure 6:
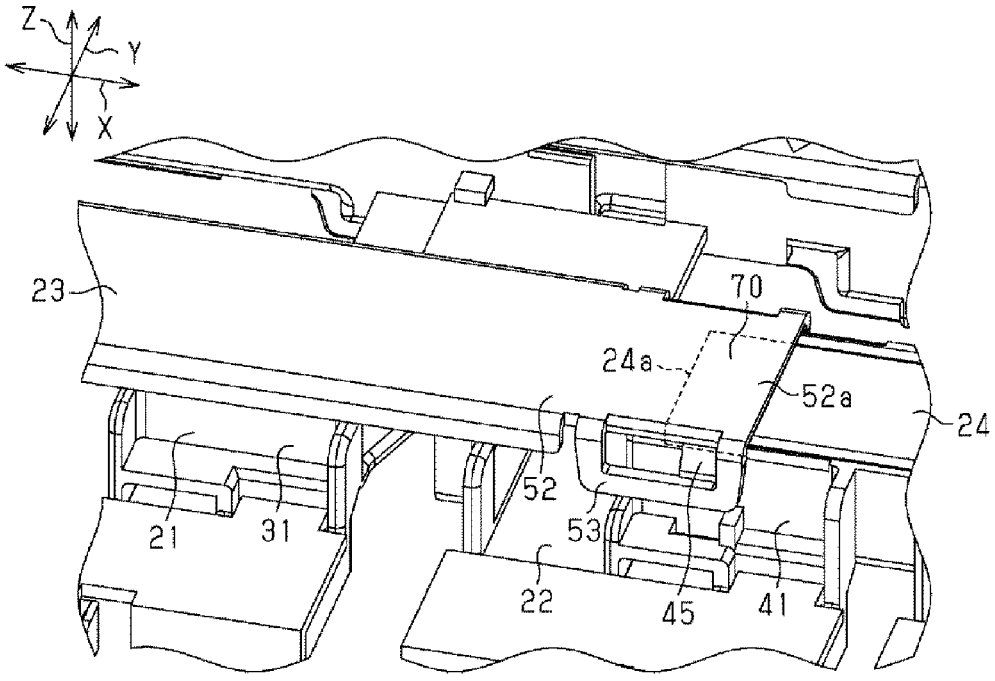
FIG. 6 is a perspective view for describing actions of the battery wiring module according to the embodiment.

FIG. 5 is a perspective view of the state of the overlapping portion 70 when the secondary battery BT contracts in the longitudinal direction X of the case 12, and FIG. 6 is a perspective view showing the state of the overlapping portion 70 when the secondary battery BT expands in the longitudinal direction X of the case 12. As shown in FIG. 6, even when the secondary battery BT expands, a state where the extension portion 52 of the first cover 23 and the second cover 24 overlap each other in the overlapping portion 70 is maintained.

In addition, as shown in FIGS. 5 and 6, as a result of the second engaging portions 53 being configured to be movable relative to the second engagement portions 45 of the second wire insertion portion 41 in the longitudinal direction X of the case 12, a configuration can be adopted in which the first case bodies 21 and the second case body 22 move relatively to each other in the longitudinal direction X in accordance with contraction and expansion in the longitudinal direction X of the secondary battery BT.

Effects of the present embodiment will be described.

(1) The case 12 includes the overlapping portions 70 in each of which the first cover 23 and the second cover 24 overlap each other in the opening direction of the openings 36 and 46 of the first and second wire insertion portions 31 and 41. With this configuration, even if the distance between the first case body 21 and the second case body 22 along the lengthwise direction of the electric wires 11 is increased due to heat expansion of the secondary battery BT or the like, it is possible to prevent a gap from being formed between the first cover 23 and the second cover 24 using the overlapping portion 70. Thus, it is possible to prevent an electric wire 11 from being exposed from between the first cover 23 and the second cover 24. In addition, by preventing a gap from being formed between the first cover 23 and the second cover 24 using the overlapping portion 70, it is possible to prevent the electric wires 11 from popping out from the gap between the first cover 23 and the second cover 24.

(2) Each of the first covers 23 includes the extension portion 52 that extends to a position where the opening 46 of the second wire insertion portion 41 is covered, and constitutes the overlapping portion 70. With this configuration, it is possible to form the overlapping portion 70 in which the first cover 23 and the second cover 24 overlap each other, using the extension portion 52 of the first cover 23.

(3) The extension portion 52 of each first cover 23 includes the second engaging portions 53 engaged with the second case body 22 in the height direction Z of the case 12, in other words, a direction that lies along the opening direction of the openings 36 and 46. With this configuration, it is possible to keep the extension portion 52 of the first cover 23 from rising, in other words, from separating from the second wire insertion portion 41 in the opening direction, as a result of the second engaging portions 53 being engaged with the second case body 22.

(4) The second engaging portions 53 are provided in the leading end portion 52a of each extension portion 52. With this configuration, it is possible to further keep the extension portion 52 of the first cover 23 from rising, as a result of the second engaging portions 53 being engaged with the second case body 22.

(5) The second engaging portions 53 are configured to be movable relative to the second case body 22 in a direction that lies along the lengthwise direction of the electric wires 11. With this configuration, it is possible to relatively move the second case body 22 in accordance with heat expansion in the longitudinal direction X of the secondary battery BT while adopting a configuration in which the extension portion 52 of the first cover 23 is engaged with the second case body 22.

(6) Regions of the second covers 24 in the overlapping portions 70, in other words, the end portions 24a in the longitudinal direction X of the second case body 22 are positioned on the inner side of the second wire insertion portions 41. With this configuration, it is possible to form the overlapping portions 70 of the first covers 23 and the second cover 24 without increasing the size of the case 12 in the opening direction of the second wire insertion portions 41.

The present embodiment can be changed as follows and carried out. Any combination of the present embodiment and the following modified examples can be made as long as there is no technical contradiction.

The number of first case bodies 21 and the number of first covers 23 that is changed based on the number of first case bodies 21 are not limited to the above embodiment, and may also be changed as appropriate based on the size in the longitudinal direction X of the secondary battery BT or the like. The number of first case bodies 21 and the number of first covers 23 may be one, for example.

A change may be made so as to adopt a configuration in which the end portion 24a of the second cover 24 constituting each overlapping portion 70 is positioned externally above the second wire insertion portion 41.

A change may be made so as to adopt a configuration in which, in each overlapping portion 70, the extension portion 52 of the first cover 23 is positioned below the end portion 24*a* of the second cover 24.

The second engaging portions 53 may be provided in a region different from the leading end portion 52*a* of the extension portion 52 of the second cover 24.

In the above embodiment, the first engaging portions 51 of the first covers 23 may be configured to be movable relative to the first engagement portions 35 of the first case bodies 21, in a direction that lies along the lengthwise direction of the electric wires 11, in other words, the longitudinal direction X of the case 12.

In the above embodiment, in each overlapping portion 70 of the first cover 23 and the second cover 24, the first cover 23 positioned on the upper side includes the extension portion 52, but, instead, the extension portions 52 may be omitted from the first cover 23 according to the above embodiment, for example. In this case, the second cover 24 positioned below the first cover 23 may be configured to include an extension portion extending in the longitudinal direction X to the first wire insertion portion 31 of the first case body 21, and the extension portion of the second cover 24 may be configured to overlap the first cover 23 in the height direction Z.

In the above embodiment, each overlapping portion 70 is formed in a region of the second wire insertion portion 41 in the longitudinal direction X of the case 12, but there is no limitation thereto, and, for example, the overlapping portion 70 may be formed in a region between the first case body 21 and the second case body 22 in the longitudinal direction X of the case 12. In addition, for example, the overlapping portion 70 may be formed in a region in the first wire insertion portion 31 in the longitudinal direction X of the case 12.

In the above embodiment, both the openings 36 and 46 of the first wire insertion portions 31 and the second wire insertion portions 41 are open in the same direction, and the opening direction is upward direction in the height direction Z, but the opening direction of both the openings 36 and 46 may be a direction other than the upward direction, and the opening direction of both the openings 36 and 46 may also be on the outer side in the width direction Y, for example.

Each first cover 23 may be formed separately from the first case body 21, or may also be formed integrally with the first case body 21. In addition, the second cover 24 may be formed separately from the second case body 22, or may also be formed integrally with the second case body 22.

In the above embodiment, the first wire insertion portions 31 and the second wire insertion portions 41 into which the electric wires 11 are inserted are applied in the longitudinal direction X of the case 12 that lies along the direction in which the battery cells C are provided in parallel, but, instead, for example, first wire insertion portions and second electric wire insertions portion into which the electric wires 11 are inserted may also be applied along the width direction Y of the case 12.

LIST OF REFERENCE NUMERALS

10 Battery wiring module
11 Electric wire
12 Case
13 Busbar
14 First wire lead-out portion

15 Second wire lead-out portion
21 First case body
22 Second case body
23 First cover
24 Second cover
24*a* End portion (region of second cover in overlapping portion)
31 First wire insertion portion
32 First coupling portion
33 First bottom wall portion
34 First side wall portion
35 First engagement portion
36 Opening of first wire insertion portion
41 Second wire insertion portion
42 Second coupling portion
43 Second bottom wall portion
44 Second side wall portion
45 Second engagement portion
46 Opening of second wire insertion portion
51 First engaging portion
52 Extension portion
52*a* Leading end portion of extension portion
53 Second engaging portion (engaging portion)
61 Third engaging portion
70 Overlapping portion
BT Secondary battery
C Battery cell
X Longitudinal direction of case
Y Width direction of case
Z Height direction of case

What is claimed is:

1. A battery wiring module to be attached to a secondary battery, comprising:
   an electric wire to be electrically connected to the secondary battery; and
   a case that houses the electric wire and includes:
   a first case body that has a groove-like first wire insertion portion through which the electric wire is passed,
   a second case body that has a groove-like second wire insertion portion through which the electric wire is passed, the second case body formed separately from the first case body, the first wire insertion portion and the second wire insertion portion provided in parallel along a lengthwise direction of the electric wire,
   a first cover that covers an opening of the first wire insertion portion, and
   a second cover that covers an opening of the second wire insertion portion, wherein
   the first wire insertion portion and the second wire insertion portion are configured to move relative to each other in the lengthwise direction of the electric wire,
   the opening of the first wire insertion portion and the opening of the second wire insertion portion are open in the same direction,
   the case further includes an overlapping portion in which the first cover and the second cover overlap each other in the opening direction of the two openings,
   the first cover includes an extension portion that extends to a position where the opening of the second wire insertion portion is covered and constitutes the overlapping portion, and
   the extension portion includes an engaging portion engaged with the second case body in a direction that lies along the opening direction of the two openings.

2. The battery wiring module according to claim 1, wherein the engaging portion is provided in a leading end portion of the extension portion.

3. The battery wiring module according to claim 1, wherein the engaging portion is configured to be movable relative to the second case body, in a direction that lies along the lengthwise direction of the electric wire.

4. The battery wiring module according to claim 1, wherein a region of the second cover in the overlapping portion is positioned on an inner side of the second wire insertion portion.

5. The battery wiring module according to claim 1, wherein the overlapping portion is configured to decrease in size along the lengthwise direction of the electric wire when the case is subject to heat expansion.

6. The battery wiring module according to claim 1, wherein the first case body of the case is formed by a pair of first case bodies, each of the pair of first case bodies including part of the first wire insertion portion, and the second case body is provided between the pair of first case bodies along the lengthwise direction of the electric wire.

* * * * *